(12) United States Patent
Swander et al.

(10) Patent No.: US 7,925,693 B2
(45) Date of Patent: Apr. 12, 2011

(54) NAT ACCESS CONTROL WITH IPSEC

(75) Inventors: Brian Swander, Bellevue, WA (US);
Richard Lamb, Seattle, WA (US);
Eduard Guzovsky, Weston, MA (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 11/627,510

(22) Filed: Jan. 26, 2007

(65) Prior Publication Data

US 2007/0124489 A1 May 31, 2007

Related U.S. Application Data

(63) Continuation-in-part of application No. 11/428,150, filed on Jun. 30, 2006, and a continuation of application No. 09/489,629, filed on Jan. 24, 2000, now Pat. No. 7,027,933.

(51) Int. Cl.
*G06F 15/16* (2006.01)
(52) U.S. Cl. ............... 709/203; 726/11; 726/12; 726/17
(58) Field of Classification Search .............. 726/2–25; 709/201–203, 217–219
See application file for complete search history.

(56) References Cited

U.S. PATENT DOCUMENTS

| | | | |
|---|---|---|---|
| 5,263,158 A | 11/1993 | Janis | |
| 5,263,165 A | 11/1993 | Janis | |
| 5,548,646 A * | 8/1996 | Aziz et al. | 713/153 |
| 5,694,595 A | 12/1997 | Jacobs et al. | |
| 5,708,780 A | 1/1998 | Levergood et al. | |
| 5,751,956 A | 5/1998 | Kirsch | |
| 5,802,299 A | 9/1998 | Logan et al. | |
| 5,826,014 A | 10/1998 | Coley et al. | |
| 5,835,722 A | 11/1998 | Bradshaw et al. | |
| 5,835,726 A | 11/1998 | Shwed et al. | |
| 5,884,025 A | 3/1999 | Baehr et al. | |
| 5,887,133 A | 3/1999 | Brown et al. | |
| 5,890,171 A | 3/1999 | Blumer et al. | |
| 5,915,088 A | 6/1999 | Basavaiah et al. | |
| 5,931,946 A | 8/1999 | Terada et al. | |
| 5,941,947 A | 8/1999 | Brown et al. | |
| 5,944,794 A | 8/1999 | Okamoto et al. | |

(Continued)

FOREIGN PATENT DOCUMENTS

JP 11348386 12/1999

OTHER PUBLICATIONS

Zornitza Genova, et al. Challenges in URL Switching for Implementing Globally Distributed Web Sites. 2000. 6 pages.

(Continued)

*Primary Examiner* — Ian N Moore
*Assistant Examiner* — Bobae K Cheney
(74) *Attorney, Agent, or Firm* — Wolf, Greenfield & Sacks, P.C.

(57) ABSTRACT

An architecture that can provide for improved network content filtering is described herein. In particular, access to remote resources can be controlled by a remote mechanism. In accordance therewith, a gateway can seamlessly and/or transparently redirect packets from a client that are meant for an intended destination to an access control component. The access control component can determine whether the client has access to the resources requested. In addition, the gateway can provide IPSec features on behalf to the client.

20 Claims, 10 Drawing Sheets

U.S. PATENT DOCUMENTS

| | | | |
|---|---|---|---|
| 5,950,205 A | | 9/1999 | Aviani, Jr. |
| 5,968,125 A | | 10/1999 | Garrick et al. |
| 5,991,807 A | | 11/1999 | Schmidt et al. |
| 5,996,077 A | * | 11/1999 | Williams ............................ 726/12 |
| 6,012,090 A | | 1/2000 | Chung et al. |
| 6,055,236 A | * | 4/2000 | Nessett et al. ................. 370/389 |
| 6,061,795 A | | 5/2000 | Dircks et al. |
| 6,061,798 A | | 5/2000 | Coley et al. |
| 6,065,056 A | | 5/2000 | Bradshaw et al. |
| 6,067,623 A | | 5/2000 | Blakley et al. |
| 6,128,298 A | | 10/2000 | Wootton et al. |
| 6,128,661 A | | 10/2000 | Flanagin et al. |
| 6,131,120 A | | 10/2000 | Reid |
| 6,137,782 A | * | 10/2000 | Sharon et al. ................. 370/255 |
| 6,147,986 A | | 11/2000 | Orsic |
| 6,182,224 B1 | | 1/2001 | Phillips et al. |
| 6,240,461 B1 | | 5/2001 | Cieslak et al. |
| 6,292,833 B1 | | 9/2001 | Liao et al. |
| 6,301,661 B1 | | 10/2001 | Shambroom |
| 6,321,336 B1 | | 11/2001 | Applegate et al. |
| 6,336,140 B1 | | 1/2002 | Elgressy et al. |
| 6,360,262 B1 | | 3/2002 | Guenthner et al. |
| 6,360,270 B1 | | 3/2002 | Cherkasova et al. |
| 6,374,298 B2 | | 4/2002 | Tanno |
| 6,389,462 B1 | | 5/2002 | Cohen et al. |
| 6,397,246 B1 | | 5/2002 | Wolfe |
| 6,405,251 B1 | | 6/2002 | Bullard et al. |
| 6,411,994 B2 | | 6/2002 | Van Allen |
| 6,415,329 B1 | * | 7/2002 | Gelman et al. ................. 709/245 |
| 6,434,627 B1 | | 8/2002 | Millet et al. |
| 6,442,615 B1 | | 8/2002 | Nordenstam et al. |
| 6,463,474 B1 | * | 10/2002 | Fuh et al. ....................... 709/225 |
| 6,480,508 B1 | | 11/2002 | Mwikalo et al. |
| 6,484,257 B1 | | 11/2002 | Ellis |
| 6,510,464 B1 | | 1/2003 | Grantges et al. |
| 6,513,061 B1 | | 1/2003 | Ebata et al. |
| 6,594,692 B1 | | 7/2003 | Reisman |
| 6,636,894 B1 | | 10/2003 | Short et al. |
| 6,678,733 B1 | | 1/2004 | Brown et al. |
| 6,683,873 B1 | | 1/2004 | Kwok et al. |
| 6,687,732 B1 | | 2/2004 | Bector et al. |
| 6,701,437 B1 | | 3/2004 | Hoke et al. |
| 6,721,784 B1 | | 4/2004 | Leonard et al. |
| 6,742,044 B1 | * | 5/2004 | Aviani et al. ................... 709/235 |
| 6,779,118 B1 | | 8/2004 | Ikudome et al. |
| 7,051,365 B1 | * | 5/2006 | Bellovin ............................ 726/11 |
| 7,117,532 B1 | | 10/2006 | Lyle et al. |
| 7,434,045 B1 | * | 10/2008 | Enderwick et al. ........... 713/158 |
| 2001/0020274 A1 | | 9/2001 | Shambroom |
| 2002/0112076 A1 | | 8/2002 | Rueda et al. |
| 2003/0053448 A1 | * | 3/2003 | Craig et al. ................... 370/353 |
| 2005/0080899 A1 | | 4/2005 | Vogel et al. |
| 2005/0083926 A1 | * | 4/2005 | Mathews et al. ............. 370/389 |
| 2006/0174019 A1 | | 8/2006 | Ikudome et al. |
| 2006/0277314 A1 | | 12/2006 | Hesselink et al. |
| 2007/0083657 A1 | | 4/2007 | Blumenau et al. |

OTHER PUBLICATIONS

James M. Westall. A Simple, Configurable, and Adaptive Network Firewall for Linux. 2000. 14 pages.

Abrahms, Doug, "Self-filter of on-line porn proposed House bill bars federal policing", Washington Times, Washington, D.C. Jul. 1, 1995 retrieved from http://proquest.umi.com/pgdweb?Did=000000018018262&Fmt=3&Deli=1&Mtd=1$Idx=11$Sid=7, pp. 1 of 2.

Frederick, Lisa, "School Watch Officials try to reduce access to seamy side of cyberspace", The Atlantic Constitution (pre-1997 Fulltext); Atlanta, GA; Sep. 26, 1995, retrieved from http://proquest.umi.com/pgdweb?DID=000000052302955&Fmt=3&Deli=Mtd=1&Idx=4&Sid=7&, pp. 1 of 2.

Asheem, Chandna, "CoroNet introduces the industry's first management system to monitor applications end-to-end across networks", PR Newswire, New York, Mar. 6, 1995, retrieved from http://proquest.umi.com/pgdweb?Did=000000006335301&Fmt=3&Deli=1&Mtd=1&Idx=4&Sid=2&, pp. 1 of 3.

Merenbloom, Paul, "A Phone Call in the Night May Head Off Disaster in the Morning", InfoWorld, Farmingham, Oct. 9, 1992, retrieved from http://proquest.umi.com/pgdweb?TS=1039394652&Did=000000000510307&Idex=8&RQT=309&F, pp. 1 of 2.

Wingfield, Nick, "WebTrack lets IS managers monitor corporate Web use", InfoWorld, San Mateo, Jul. 10, 1995, retrieved from http://proquest.umi.com/pgdweb?Did=000000006671972&Fmt=3&Deli=1&Mtd=1&idx=2&Sid=3&, pp. 1 of 2.

Grillo, Thomas, "Filtering out the filth: Computer firms offer parents choices on monitoring", Boston Globe, Boston, Mass., Sep. 18, 1995 retrieved from http://proquest.umi.com/pgdweb?TS=1039295215&Did=000000006947361&idx=2&RQT=309&f., pp. 1 of 2.

"On-Line Preventions", Washington Times, Washington D.C., Oct. 30, 1995, retrieved from http://proquest.umi.com/pgdweb?Did=000000018074389&Fmt=3&Deku=1&Mtd=1&idx=6&Sid=10, pp. 1 of 2.

Gonzalez, Sean, "Distinct TCP/IP Tools for Windows", PC Magazine, Oct. 11, 1994, V. 13, No. 17, p. 169(3), Library of Congress, Business & Company Resource Center, pp. 1 of 3.

Surkan, Michael, Security; err on the side of caution when considering Internet connections, PC Week, Oct. 30, 1995, Vo. 12, No. 43, p. 110(2), Business & Company Resource Center, p. 1 of 4.

Douglass, Michelle, "Building the points of passage: firewall-behind-a-firewall strategy grows in popularity", Computer Dealer News, Dec. 13, 1995, Vo. 11, No. 25, p. 44(2), Business & Company Resource Center, pp. 1 of 4.

J. Hibbard, Monitoring Employee Access to the Web, Computerworld, Dec. 9, 1996, p. 71.

M. Mather, "Exploring the Internet Safely—What Schools Can Do", Technology and Learning, vol. 17, No. 1, p. 38, Sep. 1996.

C. Hudgins-Bonafield, "Filtering Knowledge on the Net Just Got Simpler", Network Computing, No. 709, p. 22, 1996.

"VPN: Lucent Adds Leading Anti-Virus and Content Filtering Software to Lucent VPN Gateway and Lucent Managed Firewall" EDGE: Work Group Computing Report, Mar. 22, 1999.

"Internet Access: Net Nanny and SafeSurf Merge Technologies", EDGE: Work Group Computing Report, vol. 8, p. 25, Feb. 24, 1997.

"McAfee to Offer Server-Based Internet Guards", Newsbytes, Oct. 3, 1997.

J. Angel, "Lesson 129: Proxy Servers", Network, Apr. 1, 1999.

Net Nanny User Guide, Net Nanny Ltd., 1994-1997.

D. Comer, Internetworking with TCP/IP vol. 1: Principles, Protocols, and Architecture, Prentice Hall, Englewood Cliffs, NJ, 1991.

Ingram, "Soft Real Time Scheduling for General Purpose Client-Server Systems", 1999, retrieved from www.cl.cam.ac.uk~dmi1000/linux-srt/hotos.

Shirley Browne Paul, "Repository in a Box Toolkit for Software and Resource Sharing", 1999, retrieved from www.cs.utk.edu/~library/TechReports/1999/ut-cs-99-424.ps.Z.

Genova, Christensen, "Challenges in URL Switching for Implementing Globally", 2000, retrieved from www.csee.usf.edu/~christen/sws00.pdf.

Gralla, Preston, "How the Internet Works," 1999, QUE, Millenium Edition, p. 229.

Santo, Christine, "The Ultimate Guide to the Web for Kids & Parents," Oct. 1, 1997, Family PC, vol. 4 Issue 9, Abstract.

OA dated Feb. 18, 2009 for U.S. Appl. No. 11/428,150, 102 pages.

Benn, Wolfgang, et al., "FSM: A Federated System Manager" pp. 1-10. Originally published 1996. Retrieved from http://citeseerx.ist.psu.edu/viewdoc/summary?doi=10.1.1.52.9960.

Webpage—"The Original Internet Rating System," http://safesurf.com. 2000. Downloaded on May 30, 2000.

Webpage—"History in the Making, Creating a Child Safe Internet," http://www.safesurf.com/time.htm. 1996. Downloaded on May 30, 2000.

Webpage—"Internet Content Rating Association," http://www.icra.org/support/faqs.html.

Webpage—"Content Advisory," http://www.microsoft.com/windows/ie/ratings.asp.

Rindfrey, Jochen, "Security in the World Wide Web" 4 pages. Poster Proceedings of the 3rd International World Wide Web Conference (Darmstadt, Germany, Apr. 10-14, 1995).

Westall, J., "A Simple, Configurable, and Adaptive Firewall, for Linux," in *Proc. of the 39th Annual ACM Southeast Conference*, (Athens, Ga., Mar. 2001), pp. 162-168.

Jeffery, Clinton L. et al., "Proxy-Sharing Proxy Servers." 4 pages.

*Proceedings of the First Annual Conference on Emerging Technologies and Applications in Communications*, May 7, 1996.

* cited by examiner

NAT ACCESS CONTROL WITH IPSEC

CROSS-REFERENCE TO RELATED APPLICATIONS

This application is a continuation-in-part and claims the benefit of U.S. application Ser. No. 11/428,150, filed Jun. 30, 2006, entitled "NETWORK ACCESS CONTROL USING NETWORK ADDRESS TRANSLATION", which is a continuation and claims the benefit of U.S. Pat. No. 7,072,933, which was filed on Jan. 24, 2000 and is identically titled. The entireties of these applications are incorporated herein by reference.

BACKGROUND

With the explosion of the Internet in recent years, an increasing amount of valuable information has become available online. The Internet has become a global community, rich with resources and communication facilities. However, the Internet is also a frontier that remains largely unregulated, and hence contains many instances of harmful or objectionable material. For example, web sites containing violent or pornographic materials are common, as are sites advocating extremist viewpoints. Additionally, perusers of the Internet are often bombarded with unsolicited advertising that they may find annoying or offensive.

Accordingly, it is often desirable to filter the content that may be retrieved from the Internet. For example, a parent or teacher may wish to prevent a child from viewing materials on violent, pornographic, or bigoted sites. Additionally, users may wish to avoid the receipt of unsolicited advertisements contained within a page being viewed. Certain schemes to effect content filtering are known. For example, Net Nanny® resides on a personal computer (PC) client and works by checking intended URL's with a local list of URL's corresponding to disallowed sites. If the intended URL is on the list, the user is denied access to the site.

Most PC's and other client computers are not connected directly to the Internet. Such computers may instead be linked to the Internet through a router, or "gateway." For example, an Internet service provider may provide Internet access for a home computer through a shared connection. Additionally, some computers, especially those in a commercial environment, reside on a local area network (LAN), which is connected to the Internet through a gateway, which may be a firewall as well.

The placement of the gateway between the LAN, or the home computer, and the Internet has allowed for content filtering by way of what has come to be known as a "proxy server." Also called an application level gateway, a proxy server is essentially an application that intervenes between a sender and a receiver. Proxy servers generally employ network address translation (NAT), a technique which presents a single IP address to the Internet regardless of which particular computer behind the server sent the message. Thus, the proxy server directs all user requests to the Internet as if they were coming from a single IP address, and distributes responses back to the appropriate users.

FIG. 1 illustrates the functionality of a typical proxy server when used for content filtering. As shown, a client 200 transmits a packet for a connection to a URL on the Internet to a gateway 204. In addition to other functions such as address translation and protocol compliance, the gateway 204 instantiates an application level proxy 206 connected to the client via a connection 212. The proxy, 206 may contact a local or remote database 208 of disallowed sites to determine whether the requested URL corresponds to a disallowed site. If so, the connection is refused; if the requested URL does not correspond to a disallowed site, the proxy 206 establishes a connection 214 to the remote server 210 corresponding to the requested URL. During the same session, subsequent transmissions are passed by the proxy 206 between the connections 212 and 214.

The proxy server suffers many shortcomings as a means of filtering Internet content. Most importantly, use of a proxy server is slow, given that time must be spent to instantiate the proper proxy. Furthermore, all subsequent packets, even to a previously approved site, are still handled and passed off via the proxy, incurring additional transmission time. Additionally, the use of a proxy sever in this way often requires a reconfiguration of the client application, increasing administrative overhead for the local network.

Another system for filtering Internet content uses the PICS rating system. According to this method, a client browser is configured to first query a PICS/RSACi server regarding a requested URL. If the server indicates that the URL is not disallowed, then the browser proceeds to access the requested URL without any further intervention from the PICS/RSACi server. This system is inadequate in that it allows a clever user to bypass the filtering mechanism at the browser level without facing additional hurdles thereafter. Also, this system increases administrative and overhead costs in that it requires each client machine to be configured to provide the desired filtering communications.

SUMMARY OF THE INVENTION

In view of the foregoing, the present invention provides a method and system for network access control that extends the Network Address Translation (NAT) capabilities of a gateway, firewall, or other shared connection node to redirect communication packets, from a client on a first network destined for a target server on a second network, to an access control server, which then indicates whether access to a resource on the target server should be allowed. In particular, when the client sends handshake packets intended for the target server to the gateway or other shared connection, the gateway redirects the handshake packets to the access control server by rewriting the packet destination address. The access control server sends a response to the gateway which the gateway interprets to either allow or disallow access of the client to the resource on the target server. If access is allowed, all subsequent packets in that session are simply inspected on the fly by the gateway to determine when a connection to a different destination is attempted.

This method operates much more efficiently than existing filtering mechanisms due to its limited intervention in an approved session, as well as its ability to function without instantiating proxies or reconfiguring clients. The filtering function provided by the invention is also difficult to circumvent by local client users because it does not reside on the client machine. Additionally, the invention provides a mechanism whereby content filtering takes place with reference to distributed rather than centralized listings or standards, increasing the variety of lists that may be used.

Additional features and advantages of the invention will be made apparent from the following detailed description of illustrative embodiments which proceeds with reference to the accompanying figures.

DETAILED DESCRIPTION

Figure 1:
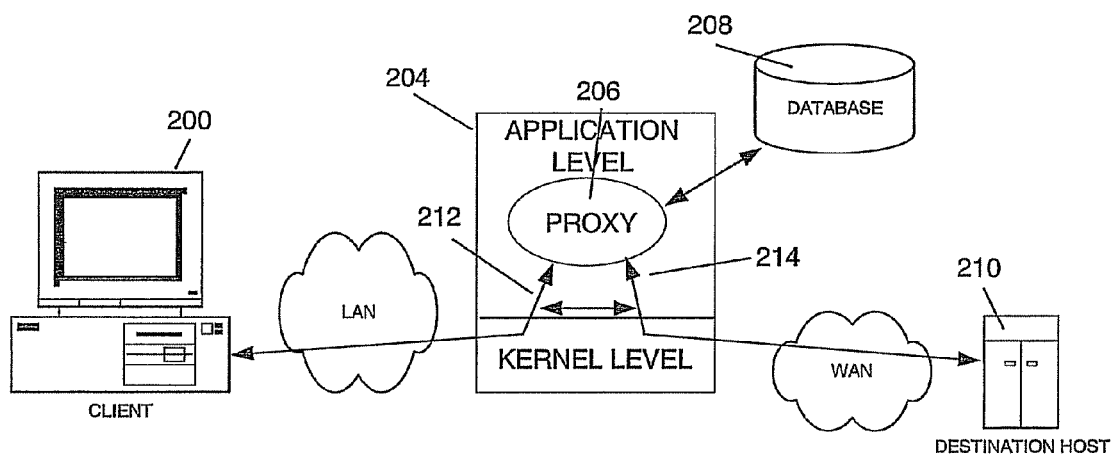
FIG. 1 is a schematic diagram generally illustrating a prior art filtering mechanism.

Turning to the drawings, wherein like reference numerals refer to like elements, the invention is illustrated as being implemented in a suitable computing environment. Although not required, portions of the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
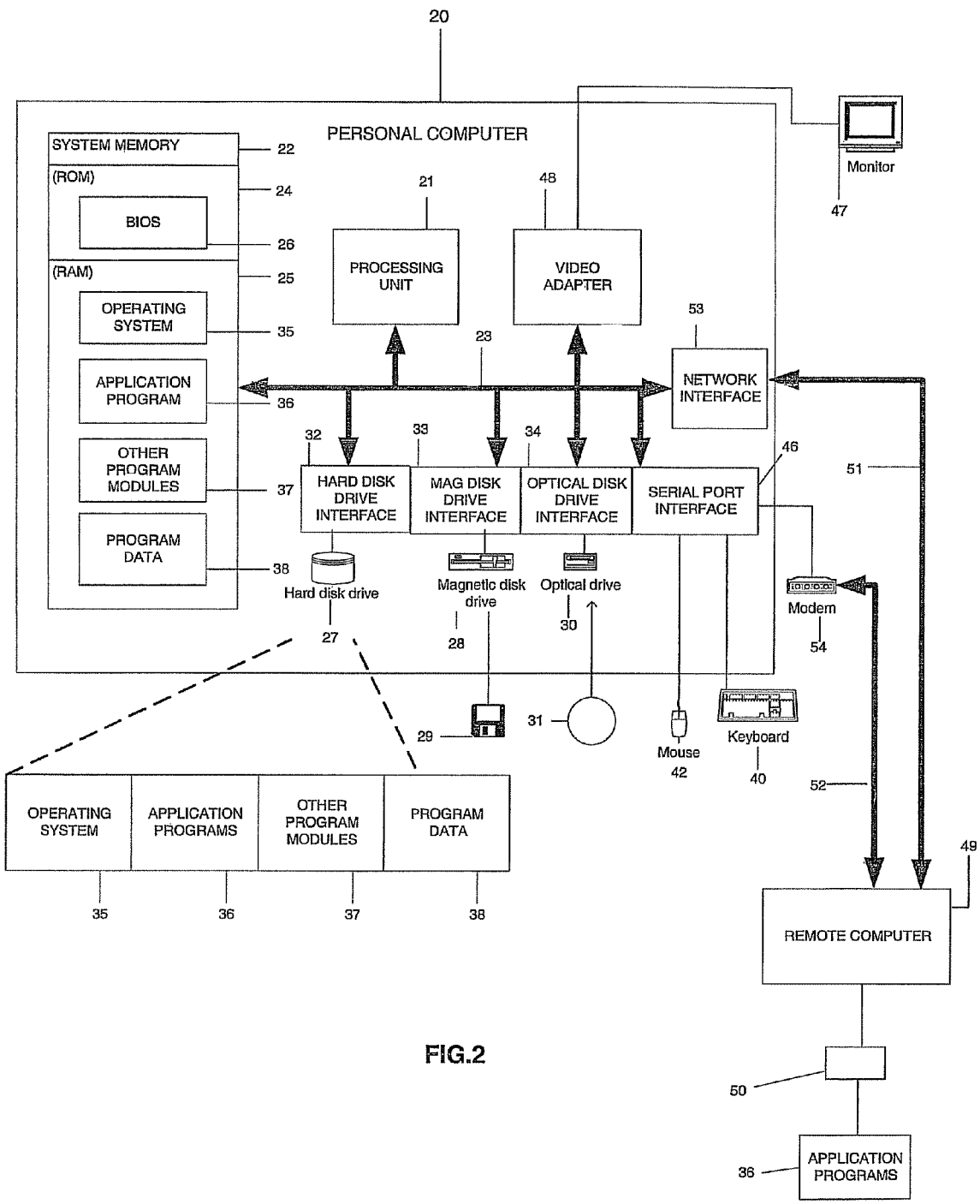
FIG. 2 is a block diagram generally illustrating an exemplary computer system.

With reference to FIG. 2, an exemplary system for implementing a network client machine includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 preferably operates in a networked environment using logical connections to one or more remote computers, such as a remote computer 49. The remote computer 49 may be another personal computer, a server, a router, a network PC, a peer device and/or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

In a LAN networking environment, the personal computer 20 is connected to the local network 51 through a network interface or adapter 53. In a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

In overview, a system is provided for controlling the information available to a network client residing on a first network, the network client being connectable to an intended information server and a controlling information server residing on a second network via a gateway which resides on both networks. In operation the controlling information server may maintain a list referring to information which is not to be made available to the network client. At the time that the network client requests information from the intended information server, the gateway redirects the request to the controlling information server, which references the list and returns to the gateway an indication of whether the requested information is to be made available to the network client. If the information is to be made available, the gateway establishes a connection between the network client and the intended information server. If the information is not to be made available, the gateway establishes a connection between the network client and the controlling information server.

Figure 3:
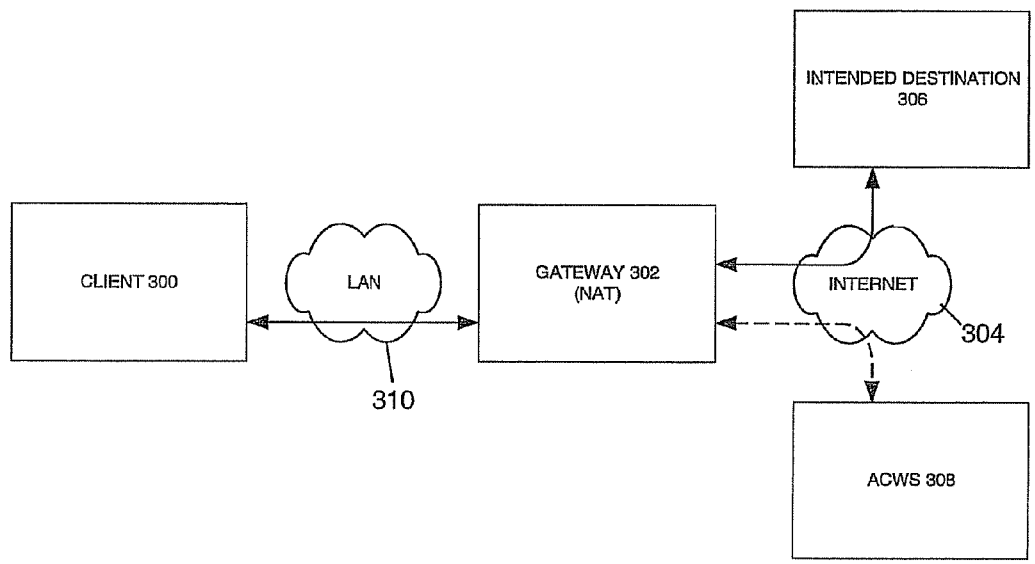
FIG. 3 is a simplified diagram of a network environment for implementing an aspect of the claimed subject matter.

Now referring to FIG. 3 wherein certain aspects of the invention are illustrated in greater detail, a client 300 residing on a local network 310 is communicably connected via a local network connection or otherwise, to a gateway 302. The client 300 may be a PC, workstation or other network capable machine, while the gateway 302 is preferably a firewall, router, or other connection node disposed between the client and a wide area or local area network 304. The gateway 302 preferably resides on both networks. The network 304 is preferably the Internet, but may alternatively be any other similar distributed linked resource system.

In order to retrieve information from the Internet, for instance from intended server 306, the client 300 sends a packet to the gateway 302 to be forwarded to the intended web site. The Internet content within the packet may be embedded in a LAN protocol at this stage, requiring formatting into an Internet protocol, typically TCP/IP, prior to transmission by the gateway.

Each node in a TCP/IP network is assigned an "IP address," which is typically composed of four numbers separated by periods, but which may be composed of more numbers depending upon the protocol used. (For example, a new generation of IP, referred to as IPv6, increases the address space from 32 to 128 bits). Nodes may be clients, servers, routers, and so on. Typically, the address is split between a Net ID, which allows the packet to be routed to other networks, and a Host ID. The exact way in which the address is split between these components is determined by the class system being used, which is indicated via the first three bits of the first byte of the address.

Typically, all of the client machines attached to the local network served by the gateway 302 may be mapped to a single IP address with respect to the other network. To accomplish this, the gateway usually also performs what is known as Network Address Translation (NAT) on any outgoing packets. This entails rewriting the source address in the outgoing packet to correspond to the IP address of the gateway on the other network. On incoming packets, the procedure is reversed, and the packets are routed to the appropriate client. This technique serves both to conserve Internet address space and to hide internal network addresses from possible intruders.

By way of example, referring again to FIG. 3, the client 300 typically sends a packet to the intended destination server 306 via the following process: the client 300 prepares a packet containing, among other things, a source IP address corresponding to the client (for example, 10.1.1.2), and a destination address corresponding to the server 306 (for example, 18.62.0.6). Following standard TCP/IP protocol routing procedure, the client 300 has been configured to send all packets destined off the local network to router 302 on its internal interface (for example, 10.1.1.4). Prior to forwarding the packet to the Internet, the NAT component of the router 302 modifies the packet's source address to correspond to the router's own Internet IP address (for example, 192.101.186.3). At the same time, the router 302 records other session-identifying information, so that the procedure can be accurately reversed for incoming packets. This is necessary because, although not shown, several other computers may also routinely access the Internet via the same router 302. Typically, if the requested URL is not found on the destination server 306, the destination server 306 returns an error code, such as "Error 404: Object not found." For more detailed information regarding TCP/IP networking, the reader is referred to *Internetworking With TCP/IP, Volume I: Principles, Protocols, and Architecture*, by Douglas E. Comer, published by Prentice Hall (1995).

In accordance with an aspect of the present invention, the network address translation capability described above is modified to provide a content filtering mechanism. Referring to FIG. 3, a server 308, which may be an ordinary web server, will be labeled herein as an Access Controlling Web Server (ACWS). The ACWS 308 preferably hosts a list of disallowed URL's, which it recognizes itself to correspond to. As will be described in fuller detail hereinafter, the gateway 302 uses its packet access during network address translation to initially alter the destination as well as the source address of a packet, such that the packet is redirected to the ACWS instead of the intended server 306. Based on a response from the ACWS 308, the gateway 302 decides either to allow all subsequent session transmissions between the client 300 and the server 306, or alternatively to refuse a connection to the server 306, preferably establishing instead a connection to the ACWS 308.

The communications of the invention will be described hereinafter with reference to standard HTTP packets. It will be understood by those skilled in the art that the contents of each packet will be tailored to accomplish the particular transmission in the desired fashion. For example, the GET URL packet will likely reference a particular URL. Generally, within the HTTP protocol, a session is established by way of a handshaking process. This handshaking process consists of a SYN packet from the client, a SYN-ACK packet from the destination, and an ACK packet from the client. This exchange is typically followed by a GET URL packet sent from the client, and a data exchange comprised of DATA and ACK packets between the client and destination. According to an embodiment of the invention, the gateway first alters this ordinary course of events by redirecting the initial handshaking such that it takes place not between the client 300 and server 306, but between the gateway 302 and the ACWS 308.

Figure 4:
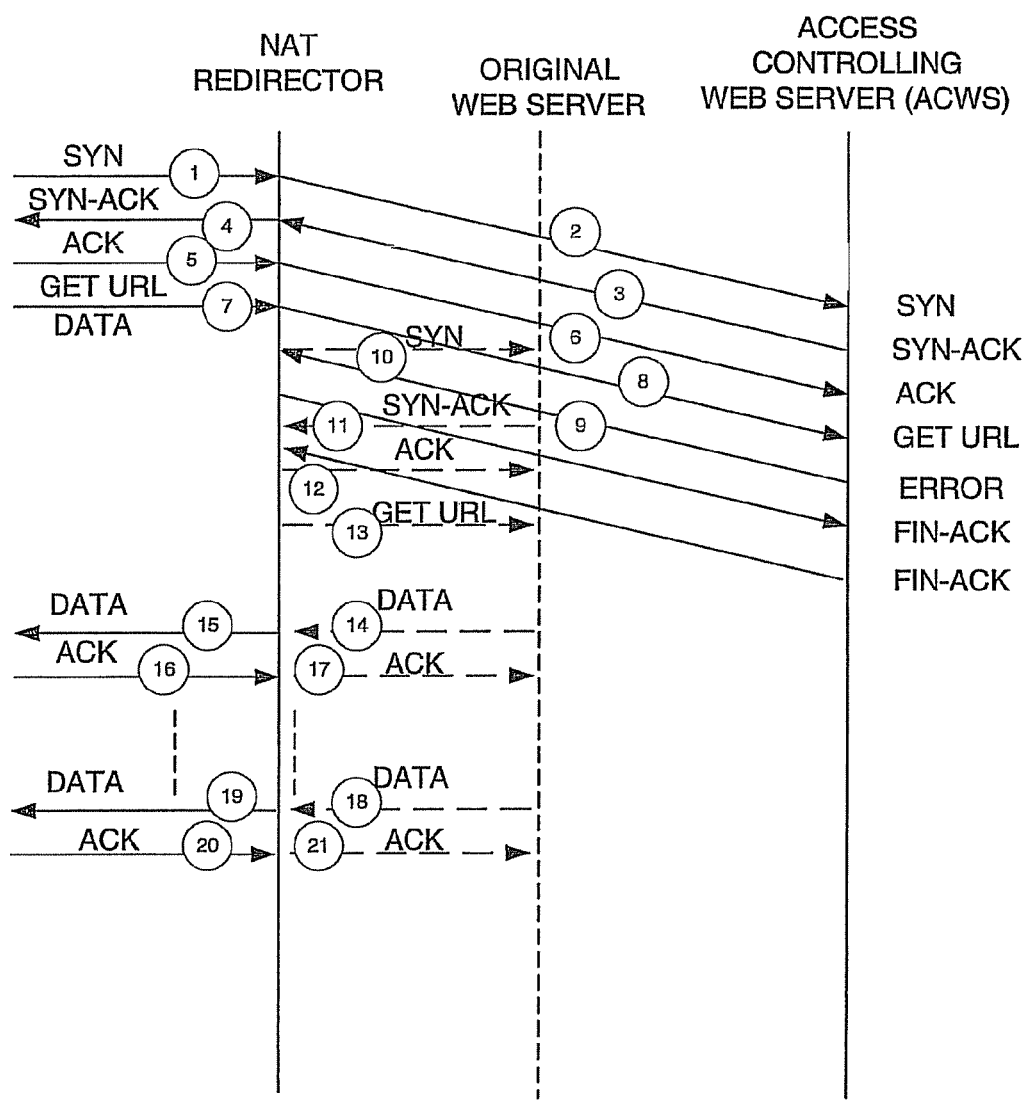
FIG. 4 is a diagram of a network communication in the environment of FIG. 3 in a case where access to a desired URL is allowed.

Certain of the communications involved in the redirection process of a preferred embodiment are illustrated in FIG. 4. The illustrated exchange corresponds to a situation wherein the requested URL is not a disallowed URL. To initiate a session, the client 302 in step 1 sends a typical SYN packet destined for the original server 306 to the gateway 302. Typically, agreed upon ports correspond to well-known applications. For example, HTTP applications are usually on port "80", so that a web server is located by specifying its address and port (80). Thus, the SYN packet will typically be addressed to port "80" of the original server 306. This combination, or some other event, may be used by the gateway 302 to detect the start of a new session and hence to begin redirection. Thus, upon receiving this SYN packet, the gateway 302 may change the packet source IP address pursuant to ordinary NAT, and further changes the packet destination IP address to be that of the ACWS 308. Thus, in step 2, the ACWS receives the packet originally destined for server 306.

The ACWS responds in an ordinary manner by transmitting a SYN-ACK packet to the gateway 302 at the indicated IP address in step 3, which is forwarded to the client 300 in step 4, again via ordinary NAT. In steps 5 and 6, an ACK packet is passed from the client to the ACWS via the gateway similarly to the transmissions of steps 1 and 2. At this point, still unaware of the redirection, the client sends a GET URL packet destined for the server 306 in step 7. As with the previous outgoing packets, the gateway 302 redirects this GET URL packet to the ACWS in step 8. As with many typical servers, the ACWS maintains or accesses a list of URL's to which it corresponds. In an embodiment of the invention, this list is preferably a list of disallowed URL's. Upon checking the list, if the ACWS does not locate an entry corresponding to the URL requested in the GET URL packet, the ACWS returns a standard error message, such as "Error 404: Object not found," to the gateway 302 in step 9.

In response to receipt of this error message, the gateway 302 determines that the requested URL is not a disallowed URL. Thus, in step 10 through 13, the gateway replays, and responds to, the initial handshaking packets to the original server 306. To facilitate this exchange, the gateway has preferably maintained a record of the packets involved in the handshaking process. The result of this sequence is to establish a connection between the client and the intended server 306 without apprising the client of the initial redirection. Alternatively, the client may be apprised of the redirection, but it is preferable in the interest of speed and convenience that the client not be required to take additional steps thereafter to effect a connection to the desired server once a URL has been approved. Once steps 2,3,6, and 8 have been repeated between the gateway 302 and the server 306 in steps 10-13, a connection is established between the client 300 and the server 306. A data exchange thereafter takes place in steps 15 et seq., with the gateway 302 intervening essentially only to accomplish ordinary NAT and to monitor packets for attempts to start a new session. Although only two data exchanges are shown, there may be an arbitrary number of data exchanges at this point.

Figure 5:
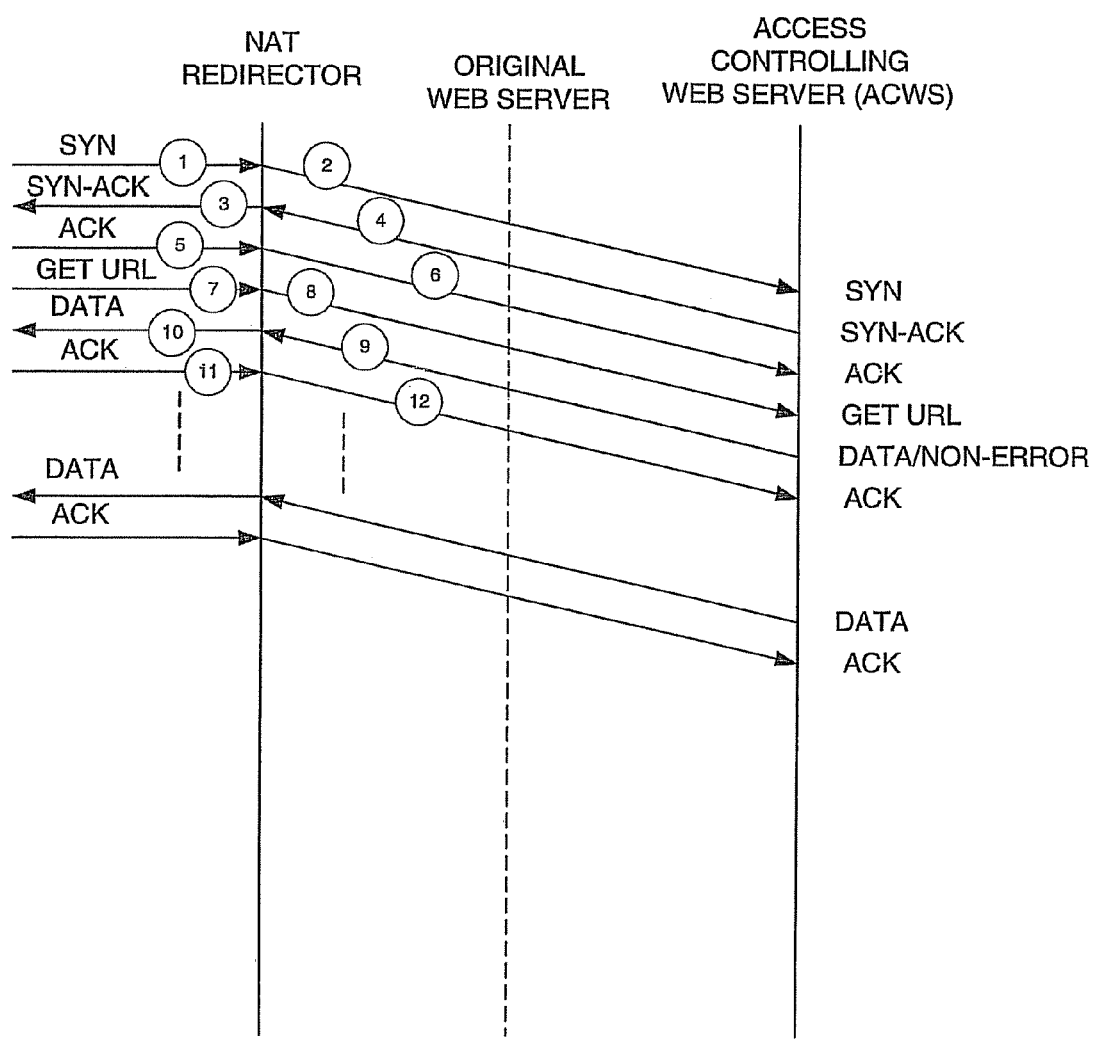
FIG. 5 is a diagram of network communications in the environment of FIG. 3 in a case where access to a desired URL is not allowed.

If the requested URL is a disallowed URL rather than an allowed URL, the network steps and communications may be as illustrated in FIG. 5. In particular, the handshaking sequence of steps 1-8 are preferably the same as the like-numbered steps in FIG. 4. However, it may be that upon receipt of the GET URL packet in step 8, the ACWS 308 finds a corresponding entry in its listing of disallowed URL's. In this event, the ACWS 308 preferably returns data, rather than an error message, to the gateway 302. Upon receiving this data, the gateway 302 preferably performs the standard reverse mapping of the Network Address Translation, forwarding the data to the client 300. Thus a connection is established between the client 300 and ACWS 308, and the client continues in communication with the ACWS 308 rather than the intended destination server 306.

In this situation, the data provided by the ACWS 308 to the client 300 is any desired content. For example, if the desired URL corresponded to advertising material, the ACWS 308 may substitute alternative advertising materials, or some other informative or entertaining material to fill the user interface space allocated for the filtered advertisement. Likewise, if the desired UTRL corresponded to offensive or inappropriate content, the ACWS 308 may supply an advertisement, or other inoffensive or appropriate material to fill the user interface space allocated for the filtered material. Alternatively, the ACWS 308 could simply provide a notation that content had been filtered or that a connection was not made, a warning or other message, or other filler material such as a design or solid color.

It may be desirable, in keeping with the invention, to allow different filtering with respect to different clients. This is easily accomplished by the gateway 302, by redirecting to different ACWS's depending upon the identity of the client. One benefit of the invention in allowing distributed content filtering, is the elimination of reliance on any single list service. This allows for greater customization and control of the filtering process and parameters.

Along similar lines, it may be desirable to apprise the ACWS of the identity of the client. This may aid in performing authentication, billing functions, customization of response, and so on. One way to accomplish this notification is to embed an identifying token in the initial HTTP GET packet application header, subsequently adjusting sequence and acknowledgment numbers to reflect the change in packet size. Such a token identifies the client and could additionally identify a particular user. Using this method, the added identifying functionality is accomplished transparently to the client, and accordingly to the user.

In an alternative embodiment, the response of the ACWS is inverted from that described above. That is, certain ACWS's could respond to a request for a disallowed URL by transmitting an error message, or a "not OK" message, while responding to an allowed URL request with an "OK" message, instead of an error message. In such an embodiment, the gateway 302 would modify its behavior in accordance with this alternate response scheme, so as to enable connections only to allowed URL's. Accordingly, on receipt of an "OK" response, the gateway would make the desired connection and step out of the process. Examples of potential ACWS's which behave in this manner are existing RSACi Web servers.

It will be appreciated that an improved system and method of network content filtering has been described, which overcomes many shortcomings inherent in prior content filtering methods. The described system and method additionally enable distributed filtering relying on a wide variety of independent content listings, allowing for greater customization and ease of maintenance. All of the references cited herein are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of the invention. For example, those of skill in the art will recognize that certain elements of the illustrated embodiments shown in software may be implemented in hardware and vice versa or that the illustrated embodiments can be modified in arrangement and detail without departing from the spirit of the invention. Therefore the invention as described herein contemplates all such embodiments as may come within the scope of the following claims and equivalents thereof.

In addition to the aspects described supra, the claimed subject matter can be employed in connection with Internet Protocol Security (IPSec). Employing IPSec in connection with a network firewall can be a great deal richer with respect to controlling access. For example, a conventional firewall that limits access to a network based upon an IP address or a port number often leads to problems for legitimate access attempts from roaming parties, since the roaming parties often do not know in advance what IP address they will be assigned. However, by allowing a party to be authenticated to the network based upon credentials other than IP address, IPSec access can be much more flexible.

IPSec generally relates to a suite of protocols for securing Internet Protocol (IP) communications by encrypting and/or authenticating each IP packet in a data stream. IPsec can also include protocols for cryptographic key establishment. Traditionally, IPSec can operate in either transport mode or tunnel mode, which, along with various other distinguishing aspects of the claimed subject matter, is described in more detail with reference to FIG. 6 infra.

Figure 6:
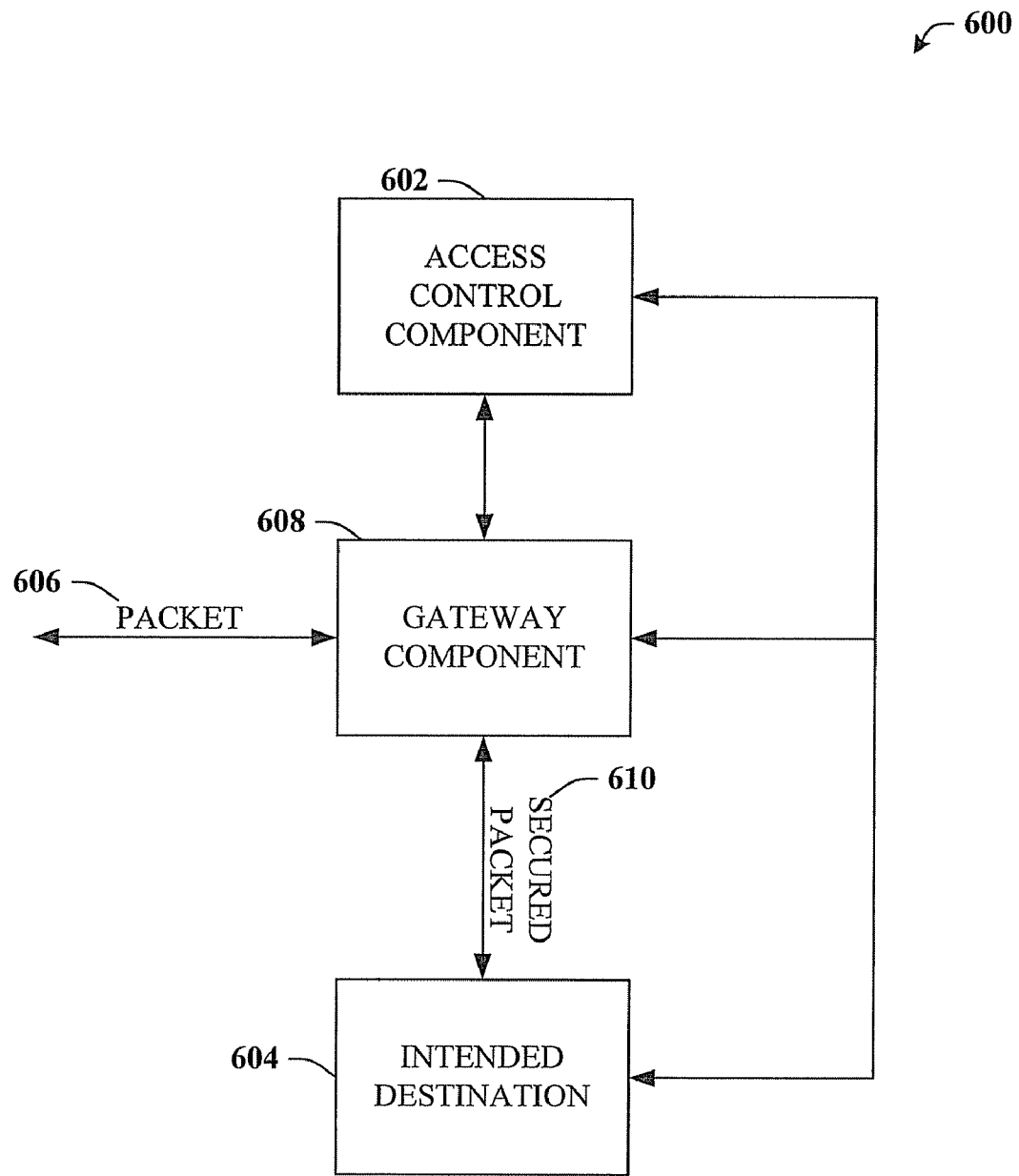
FIG. 6 is an exemplary block diagram of a system that can provide access to remote resources that utilize Internet Protocol Security (IPSec) protocol.

Turning now to FIG. 6, an example system 600 that can provide access to remote resources that utilize IPSec protocol is depicted. Generally, the system 600 can include an access control component 602 that can substantially include the features described in connection with the ACWS 308 of FIG. 3. Additionally or alternatively, the access control component 602 can determine whether an intended destination 604 requires a packet 606 from a client (not shown) to be secured. If not, then no additional work need be done. However, if the intended destination 604 does require secure communication, such as, e.g., in accordance with an IPSec policy, then certain difficulties can arise.

As discussed above, IPSec can operate in two different modes. In transport mode only the payload/message of the IP packet is typically encrypted. The packet is generally fully routable since the IP header is sent as plain text; however, the packet normally cannot cross NAT interfaces (e.g., gateway 302 from FIG. 3), as this will often invalidate its hash value. Accordingly, middle systems such as gateways and/or NATs tend to break up end-to-end authentication, so transport mode is generally applicable only for host-to-host communications.

By contrast, in tunnel mode, the entire IP packet is encrypted. As such, the packet can then be encapsulated into a new IP packet for routing to a network. Tunnel mode is typically used for network-to-network communications (secure tunnels between routers) or host-to-network and host-to-host communications over the Internet.

Accordingly, referring back to FIG. 3, if the IPSec operations are performed on the client 300 (as would customarily be the case) then transport mode IPSec can lead to the difficulties described above. Another difficulty exists for the case that the client 300 is not capable of supporting (e.g., no IPSec Stack on the client 300) or otherwise does not support (e.g., no suitable software components) IPSec operations. In that case, then there exists the potential that the client 300 could not establish a communication session with the intended destination 306 if the intended destination only allows IPSec communication.

In order to mitigate these and other difficulties, and turning again to FIG. 6, the system 600 can also include a gateway component 608 that can secure the packet 606 and can transmit a secured packet 610 to the intended destination 604. It is to be appreciated that the gateway component 608 can secure, encrypt, and/or authenticate the packets in accordance with the particular IPSec policy/protocol associated with the intended destination 604. Thus, the gateway component 608 can effectively secure the client's traffic and deliver it to the intended destination 306 in a suitable format based upon, e.g., information relating to one or both of the client and the intended destination 604, all or portions of which can be received from the access control component. It is to be further appreciated that the foregoing can be accomplished even while the packet 606 (or any communication between the gateway component 608 and the client) is not secured by way of the IPSec policy; or secured based upon a local and/or disparate IPSec policy.

Figure 7:
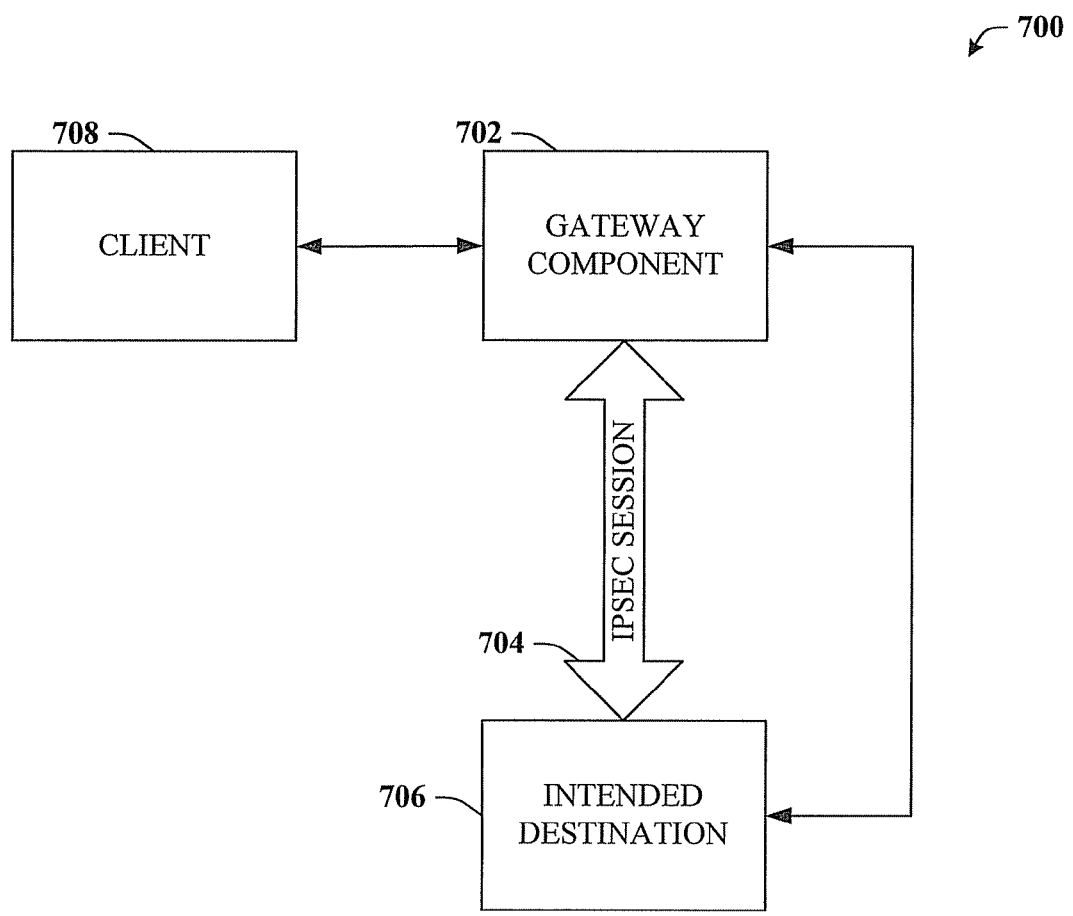
FIG. 7 is an exemplary block diagram of a system that can establish an IPSec connection session with an intended destination on behalf of a client.

With reference now to FIG. 7, an example system 700 that can establish an IPSec communication session on behalf of a third party is illustrated. Generally, the system can include a gateway component 702 that can, in accordance with some aspects of the claimed subject matter, be substantially similar to components 302 and 608 from FIGS. 3 and 6, respectively. Additionally or alternatively, the gateway component 702 can establish an IPSec connection session 704 with the intended destination 706 on behalf of the client 708. In accordance therewith, the gateway component 702 can dynamically secure any or all additional packets from the client 708 (e.g., those meant for the intended destination 706) for the duration of the IPSec connection session 704. Moreover, the gateway component 702 can secure that packets by way of either IPSec transport mode or IPSec tunnel mode.

It is to be appreciated that various techniques exist in order to establish an IPSec connection session 704 on behalf of the client 708. In particular, in addition to encrypting or otherwise securing communication data, IPSec can also authenticate the principals involved in the communication. Thus, while the intended destination 706 can readily supply a security association or some other credential for identification/authentication, the intended destination 706 can also require the same from the gateway component 702.

In one case, a credential associated with the gateway component 702 can be employed to establish the IPSec connection session 704 on behalf of the client 708. For example, the gateway component 702 can be a trusted principal allowed or acknowledged by the intended destination 706. In essence, while the information exchanged by way of the IPSec connection session 704 may ultimately be directed to the client 708, the intended destination 706 is aware that the IPSec connection session 704 has been established with the gateway component 702 rather than with the client 708. The credential associated with the gateway component 702 may be extant on the gateway component 702, or may be obtained from an entity such as the client 708 (e.g., a gateway credential supplied by a trusted user or trusted client machine) or an access control component such as indicated by reference numeral 602 from FIG. 6 (e.g., the gateway credential is distributed to the gateway component 702 in accordance with a particular policy of the intended destination 706).

In another case, the gateway component 702 can employ a credential associated with the client 708 (or a user of the client 708) to establish the IPSec connection session 704. For example, the intended destination 706 may only allow access to very particular principals such as particular devices (e.g., client 708) or particular users (e.g., a user of client 708). Accordingly, there are many situations in which a trusted principal can exist behind the gateway component 702, but cannot communicate directly. For instance a user of the client 708 may be a trusted principal, while the client 708 itself is not trusted or not capable of supporting the policy maintained by the intended destination 706. As another example, the IPSec communication session 704 may be employ transport mode, creating further difficulties for topologies that are not simply host-to-host.

Accordingly, while much of the discussion herein relates to facilitating communication that is transparent to the client 708, the gateway 702 can establish an IPSec communication session 704 on behalf of the client 708 by using a credential associated with a user or the client 708. Thus, there can exist a type of transparency for the intended destination 706 as well. For example, the intended destination 706 can infer that communication is ongoing with a trusted principal, when in fact, the gateway component 702 can be merely utilizing the trusted principal's credential.

As described supra (e.g., in connection with the description relating to FIG. 5), the client 708 can employ a token to identify either the client 708 or a particular user of the client 708. This token can be transmitted to the gateway component 702 as well as forwarded to an access control component. In accordance with an aspect of the claimed subject matter, the token can include security association information and/or other credential information. The gateway component 702 can extract the credential from the token and utilize it for establishing secure communications on behalf of a particular user or client 708, as described herein.

Figure 8:
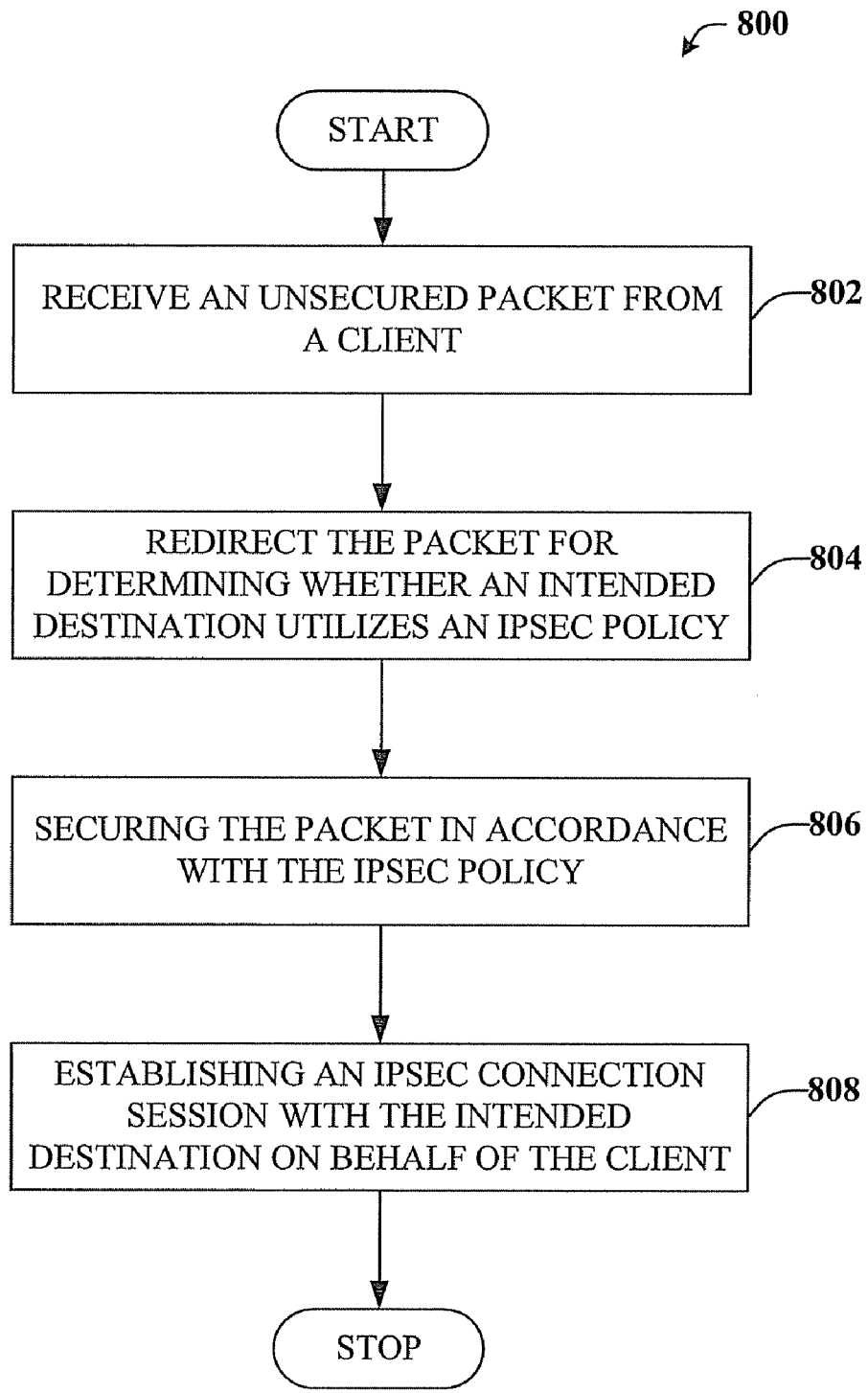
FIG. 8 is an exemplary flowchart of procedures that provides a method for facilitating IPSec support in a controlled access environment.

Referring now to FIG. 8, an exemplary method for facilitating IPSec support in a controlled access environment is illustrated. Generally, at reference numeral 802 an unsecured packet from a client can be received. Typically, the packet can be received by a gateway and/or NAT component. In accordance with one aspect of the claimed subject matter an unsecured packet is one in which there is no IPSec encryption, authentication, or some other feature of an IPSec policy.

At reference numeral 804, the packet can be redirected for determining whether an intended destination utilizes an IPSec policy. For example, the packet can originate from a client, then be redirected at the gateway to an access control component. At the access control component, if it is determined that the intended destination requires IPSec, then the access control component can supply this information to the gateway component. It is to be appreciated that the redirected packet can also be employed to control (e.g., grant or forbid) client access to the intended destination as has been detailed supra.

At reference numeral 806, the packet can be secured in accordance with the IPSec policy of the intended destination. In addition, the secured packet can be transmitted to the intended destination as substantially described herein. At reference numeral 808, an IPSec connection session can be established between the gateway and the intended destination on behalf of the client. It is to be appreciated that the IPSec connection session instantiated on behalf of the client can be established by employing a credential associated with one of several different entities. For example, the credential can be associated with the gateway. Additionally or alternatively, the credential can be associated with a particular user or a client machine of the user. In the later case, the credential can be propagated to the gateway by way of a token that includes the credential.

Figure 9:
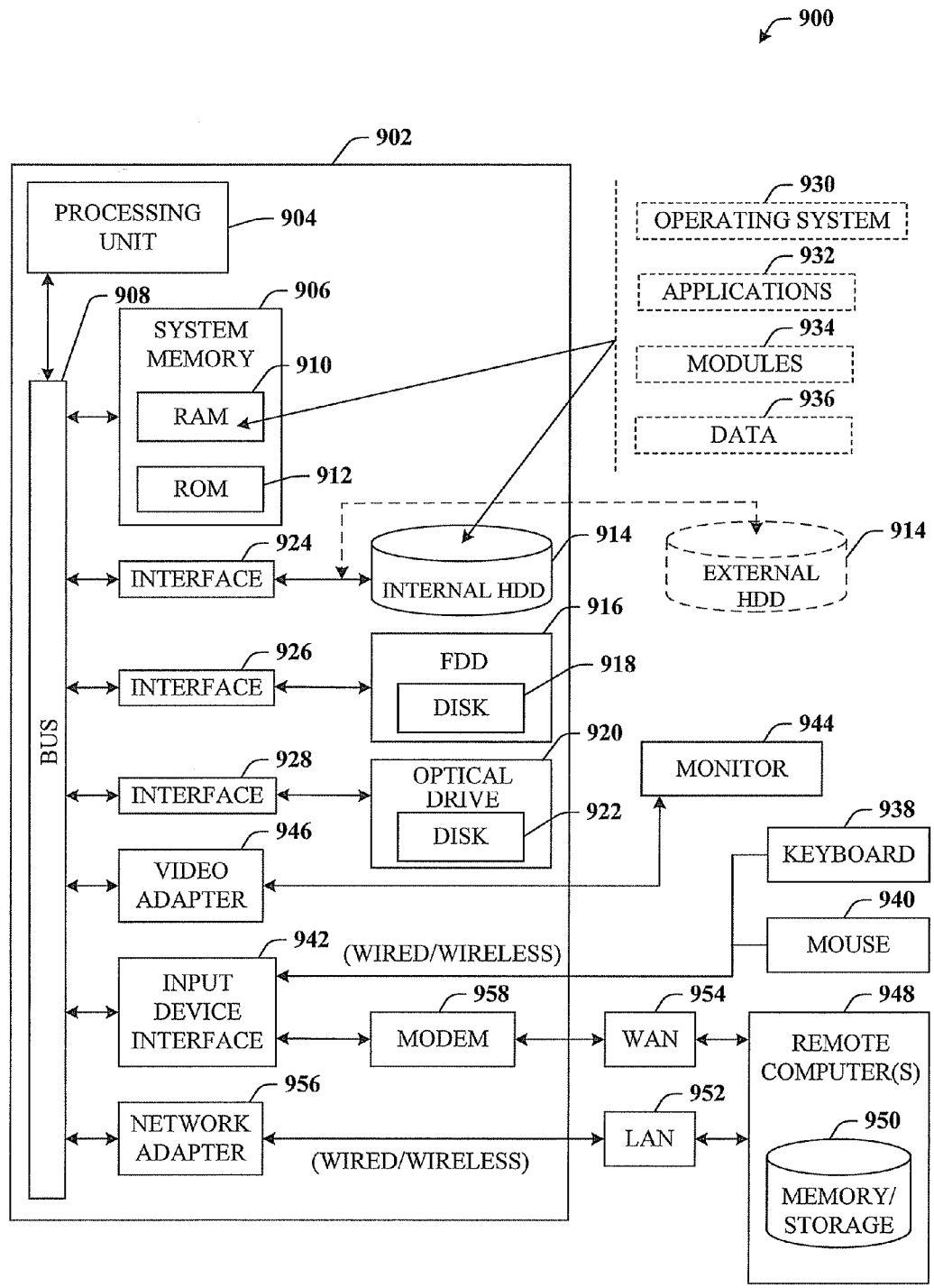
FIGS. 9 and 10 illustrate exemplary computing environments.

Referring now to FIG. 9, there is illustrated a block diagram of an exemplary computer system operable to execute the disclosed architecture. In order to provide additional context for various aspects of the claimed subject matter, FIG. 9 and the following discussion are intended to provide a brief, general description of a suitable computing environment 900 in which the various aspects of the claimed subject matter can be implemented. Additionally, while the claimed subject matter has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the invention includes a computer 902, the computer 902 including a processing unit 904, a system memory 906 and a system bus 908. The system bus 908 couples to system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM)

912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE1394 interface technologies. Other external drive connection technologies are within contemplation of the subject invention.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 9BaseT wired Ethernet networks used in many offices.

Figure 10:
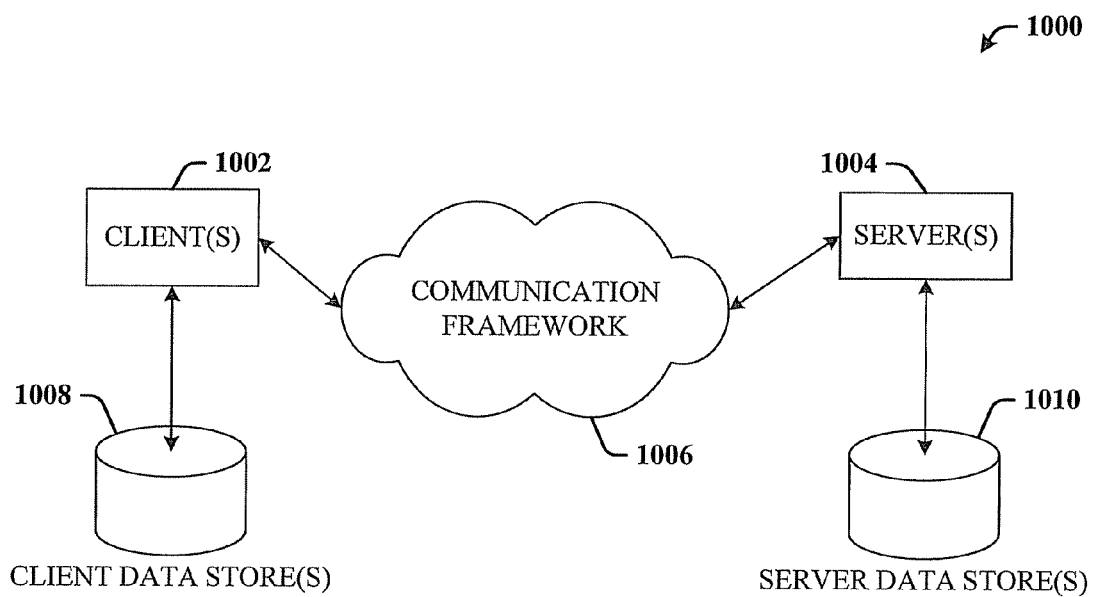

Referring now to FIG. 10, there is illustrated a schematic block diagram of an exemplary computer compilation system operable to execute the disclosed architecture. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

It is to be appreciated that, as used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that provides access to remote resources that utilize Internet Protocol Security (IPSec) protocol comprising:

a processing unit programmed to execute:

a gateway component acting as a network address translator for a connection between a client and an intended destination hosting a desired remote resource, wherein acting as a network address translator comprises receiving from the client a connection request and packets to be transmitted to the intended destination; and a security component that receives information regarding the connection request from the gateway component and determines whether packets from the client to the intended destination should be secured, the security component providing a response to the gateway component indicating whether the intended destination requires security, wherein the gateway component, upon receiving data, determines whether the data comprises a connection request and, when the data comprises a connection request, transmits at least information regarding the connection request to the security component and, when the response from the security component indicates that the intended destination requires security, establishes a secure connection to the intended destination and stores a record corresponding to the secure connection, and when the data comprises a packet to be transmitted to the intended destination that is not a connection request, determines whether the packet corresponds to a previously-established secure connection for which the gateway component has a record and, when the packet corresponds to a previously-established secure connection, without transmitting the packet to the security component, secures the packet received from the client in accordance with a security policy for the intended destination for the previously-established secure connection and transmits a secured packet to the intended destination.

2. The system of claim 1, wherein the secured packet is a packet secured and/or authenticated by way of an IPSec policy that is the security policy for the intended destination.

3. The system of claim 1, wherein the gateway component receives IPSec information from the security component regarding at least one of the client or the intended destination.

4. The system of claim 1, wherein the gateway component establishes the secure connection by establishing an IPSec connection session with the intended destination on behalf of the client.

5. The system of claim 4, wherein the gateway component employs a credential associated with at least one of the client or a user of the client to establish the IPSec connection session.

6. The system of claim 4, wherein the gateway component secures subsequent packets from the client for the duration of the IPSec connection session as the subsequent packets are received, the subsequent packets being received after the second time.

7. The system of claim 6, wherein the gateway component secures the packets by way of IPSec transport mode.

8. The system of claim 6, wherein the gateway component secures the packets by way of IPSec tunnel mode.

9. The system of claim 1, wherein:
the connection request received from the client comprises at least one data packet comprising connection setup information and a destination address, and
the destination address is an Internet Protocol (IP) address corresponding to an intended destination server.

10. The system of claim 9, wherein the gateway component receives the at least one data packet, rewrites the destination address, and redirects the data packet to the security component.

11. The system of claim 10, wherein the gateway component redirects the entirety of the at least one data packet.

12. The system of claim 9, wherein the at least one data packet comprising connection setup information is at least one handshaking packet for establishing a connection according to the Transmission Control Protocol (TCP).

13. The system of claim 1, wherein the security component reviews at least a portion of the connection request received by the gateway component from the client to determine whether the intended destination requires security.

14. The system of claim 13, wherein the security component reviews the at least a portion of the connection request by redirecting the connection request to a security server and receives the response indicating whether the intended destination requires security from the server.

15. The system of claim 14, wherein the gateway component redirects the connection request to the security component to determine whether the intended destination requires the packet to be secured and does not redirect the packet to the security component.

16. The system of claim 1, wherein the response indicating whether the intended destination requires security indicates the security policy for the intended destination.

17. The system of claim 1, wherein the gateway component receives the connection request from the client at a first time and receives the packets at a second time, later than the first time, and
the gateway component, when the packets are received at the second time, secures the packet and transmits the secured packet to the intended destination using the secure connection without communicating to the security component regarding the packet.

18. A method for facilitating IPSec support in a controlled access environment, comprising:
receiving at a network address translator at a first time a connection request and at a second time, later than the first time, an unsecured packet from a client, the connection request and the unsecured packet being intended for an intended destination hosting a desired remote resource, wherein the receiving comprises, upon receiving data, determining whether the data comprises a connection request;
when data is determined to comprise a connection request, redirecting the connection request to a security server for determining whether the intended destination for the packet utilizes an IPSec policy;
receiving a response from the security server indicating whether the intended destination utilizes an IPSec policy and, when the intended destination utilizes an IPSec policy, indicating a particular IPSec policy used by the intended destination;
when the response from the security server indicates that the intended destination utilizes an IPSec policy:
establishing a secure connection between the intended destination and the network address translator according to the particular IPSec policy and storing on the network address translator a record corresponding to the secure connection;
when the unsecured packet that is not a connection request is received at the second time, on the network address translator determining whether the unsecured packet corresponds to a previously-established secure connection for which a record is stored on the network address translator and, when the unsecured packet corresponds to a previously-established secure connection, on the network address translator securing the unsecured packet in accordance with the particular IPSec policy to create a secured packet; and
transmitting the secured packet to the intended destination over the secure connection; and
when the response indicates that the intended destination does not utilize an IPSec policy and when the unsecured packet is received at the second time, transmitting the unsecured packet to the intended destination.

19. An apparatus to operate a network address translator to facilitate IPSec support in a controlled access environment comprising:
at least one processor programmed to act as:
a first component to operate network address translator to receive at a first time a connection request and at a second time, later than the first time, an unsecured packet from a client that is not a connection request, wherein the the first component, upon receiving data, determines whether the data comprises a connection request;
a second component to ascertain whether an intended destination for the connection request and the unsecured packet employs an IPSec protocol, wherein the second component receives a connection request from the first component when the data is determined by the first component to comprise a connection request;

a third component to determine whether the unsecured packet that is not a connection request corresponds to a previously-established secure connection for which a record is stored and, when the unsecured packet corresponds to a previously-established secure connection, to encrypt the unsecured packet that is not a connection request in accordance with the IPSec protocol to create a secured packet, when it is ascertained that the intended destination employs an IPSec protocol; and a fourth component to operate the network address translator to establish an IPSec connection session to the intended destination and, when the unsecured packet is received at the second time, to transmit the secured packet on behalf of the client, when it is ascertained that the intended destination employs an IPSec protocol.

20. The computer-implemented system of claim 19, wherein the second component comprises a fifth component to transmit the connection request to a security server and a sixth component to receive a response from the security server indicating whether the intended destination employs an IPSec protocol and, if the intended destination employs an IPSec policy, to indicate a particular IPSec policy used by the intended destination.

* * * * *